United States Patent [19]

Korge

[11] Patent Number: 5,406,863
[45] Date of Patent: Apr. 18, 1995

[54] TOOTHED WHEEL WITH A VARIABLE NUMBER OF TEETH

[76] Inventor: Gerd Korge, Hirschsprung 10, 70565 Stuttgart 1, Germany

[21] Appl. No.: 129,165

[22] PCT Filed: Apr. 2, 1992

[86] PCT No.: PCT/EP92/00733
§ 371 Date: Oct. 6, 1993
§ 102(e) Date: Oct. 6, 1993

[87] PCT Pub. No.: WO92/17718
PCT Pub. Date: Oct. 15, 1992

[30] Foreign Application Priority Data

Apr. 6, 1991 [DE] Germany .................. 41 11 195.8

[51] Int. Cl.⁶ .......................................... F16H 55/17
[52] U.S. Cl. ................................. 74/439; 475/182
[58] Field of Search ................. 74/439; 475/182

[56] References Cited

U.S. PATENT DOCUMENTS

| 2,669,885 | 2/1954 | Fedri | 475/182 X |
| 3,051,022 | 9/1962 | Way, Jr. | 475/182 |
| 4,497,221 | 2/1985 | Koser | 74/866 |

FOREIGN PATENT DOCUMENTS

WO92/09828  6/1992  WIPO ................. 475/182

Primary Examiner—Allan D. Herrmann
Attorney, Agent, or Firm—Jones, Tullar & Cooper

[57] ABSTRACT

A toothed wheel with a variable number of teeth has a toothed ring formed by a driving chain or belt. The referenced diameter of the toothed wheel can be modified by adding or removing individual links by means of an auxiliary toothed wheel; so as to modify the length of the drive chain. At least one transmission member cooperates with the toothed wheel to insure the transmission of energy. The auxiliary toothed wheel is displaced together with the lateral guide of the driving chain, so that its radial spacing from the axis of rotation changes synchronically with the radial spacing change of the lateral guide of the driving chain.

9 Claims, 4 Drawing Sheets

TOOTHED WHEEL WITH A VARIABLE NUMBER OF TEETH

BACKGROUND OF THE INVENTION

The present invention relates to a toothed wheel or gear with a variable number of teeth.

Such gear mechanisms are known from German Published, Non-Examined Patent Applications DE-OS 21 62 074, DE-OS 18 06 571, from German Letters Patents DE-PS 854 301, 727 593, 142 329 and from French Letters Patents 1 114 218 and 1 295 478.

German Patent Publication DE-A-18 06 571 discloses a single-stage planetary gear, in which the drive chain acts as an internally-geared toothed wheel. This toothed wheel is formed by a drive chain, the length of which is adjustable. A transmission ratio of the planetary gear is changed by changing the length of the drive chain. It has been shown to be disadvantageous that the drive chain is guided only over a few radially adjustable guides distributed over the circumference, so that the gear ring greatly diverges from its ideal circular shape. Therefore this gear can only be used at low rpm and also with high noise output.

SUMMARY OF THE INVENTION

Based on this state of the art, it is an object of the present invention to provide a multistage shiftable gear which can also function at high rpm and with low operational noise.

To attain this object, the present invention provides that all links of the drive chain located in the reference circle are laterally guided at a concentric, radially changeable distance from the axis of rotation and that the drive chain is placed under pre-stress.

Because of the present invention providing support of each individual link of the drive chain located in the reference circle it is assured that the chain does not s ag between the individual supports, and instead takes on an ideal circular shape. In this way a continuously good meshing between the toothed wheel and the transfer member is assured, so that it is also possible to attain a high rpm and especially to keep operational noise low.

In addition, the auxiliary toothed wheel can be disposed in a space-saving manner at the shortest possible distance from the gear ring. A sturdy construction along with an optimally low structural weight is possible for this reason. Thus, the deflection of the drive chain into the magazine can take place in a space-saving manner and with the smallest deflection radius. During operation, the drive chain is supported on the deflection side in such a way that the last link is still completely located in the reference diameter. Therefore, an optimal transfer of force and optimally low operating noise is achieved. A gear change during operation and even under load is possible, however, the shifting operation can only be performed if the energy transfer member does not prevent it in a positively form-fitting manner. The gear of the present invention is suited in particular for use in a planetary gear wherein the toothed wheel does not turn.

Preferably, the last link of the drive chain which is still engaged is supported by the auxiliary toothed wheel, by means of which an optimum support of the drive chain ahead of the magazine is assured and no friction problems occur during transit into the magazine. It is also pointed out, that belts, straps and wheels can be used as transfer members, where in the case of belts and straps the force to be transferred is evenly spaced in an advantageous manner over the entire envelope arc.

The gear change is realized in a particularly simple structural manner if the links of the drive chain have lateral support surfaces which cooperate with two cones, the axial distance of which can be changed, wherein the axial distance change of the cones is correlated with a change in the reference diameter of the gear ring and a corresponding change of the gear ratio is connected therewith.

Guidance optimization can be achieved in that the shape of the support surfaces on both sides of the drive chain is represented by two planes inclined at an angle with respect to each other, so that all four planes, two per cone, are supported in the form of lines on the cones. The contact of the lines is maintained in every gear. This provides support surfaces having a slight Hertzian pressure and a permit a linear radial displacement of the shaft of the auxiliary toothed wheel with respect to the axial displacement of the cones.

The lateral support surfaces can also be formed by two counter-cones of the drive chain, which have a circular conical shape over at least a part of their circumference and which can when preferably be disposed coaxially to the hinges of the drive chain.

In order to be able to transfer large torque with certainty, the auxiliary toothed wheel can, in a particularly advantageous manner, be radially displaceable in radial guide recesses of the two cones, extending approximately parallel to the cone surfaces. Shock-free energy transfer over a large shift range can be assured in that the neutral bending lines of the drive chain and the transfer member in the form of a toothed belt or the chain approximately coincide at least in the area of the energy transfer.

A link of a chain is normally only slightly kinked. However, when entering the loop around the auxiliary toothed wheel, the drive chain is very strongly kinked, which results in excessive wear on the chain links at high rpm. Long service life of the drive chain or of another chain meshing with it can be achieved with high-speed gears in particular in that their links convey lubricants through the chain link with the aid of centrifugal force.

A cylinder-shaped auxiliary toothed wheel, which extends radially and inclined parallel to the cone surface and essentially is located behind the cone surface, can be provided particularly advantageously in each cone, wherein teeth of the auxiliary toothed wheel are engaged, extending beyond the cone surface through a slit-shaped window in the cone surface, with a lateral tooth structure of the drive chain, and wherein the auxiliary toothed wheels can be rotated in steps via a step-by-step ratchet mechanism, a step causing a displacement of the drive chain by one link.

In a particularly advantageous manner the two cylinder-shaped auxiliary toothed wheels and the changing of the axial distances of the cone surfaces can be coupled in such a way that the change in distance between the cone surfaces and the change in the length of the circumference of the drive chain supported by the cone surfaces correspond to each other.

BRIEF DESCRIPTION OF THE DRAWINGS

Further embodiments of the invention ensue from the dependent claims and their advantages will be described in detail in the specification which follows by means of the attached drawings. Shown are:

DESCRIPTION OF THE PREFERRED EMBODIMENTS

Figure 1:
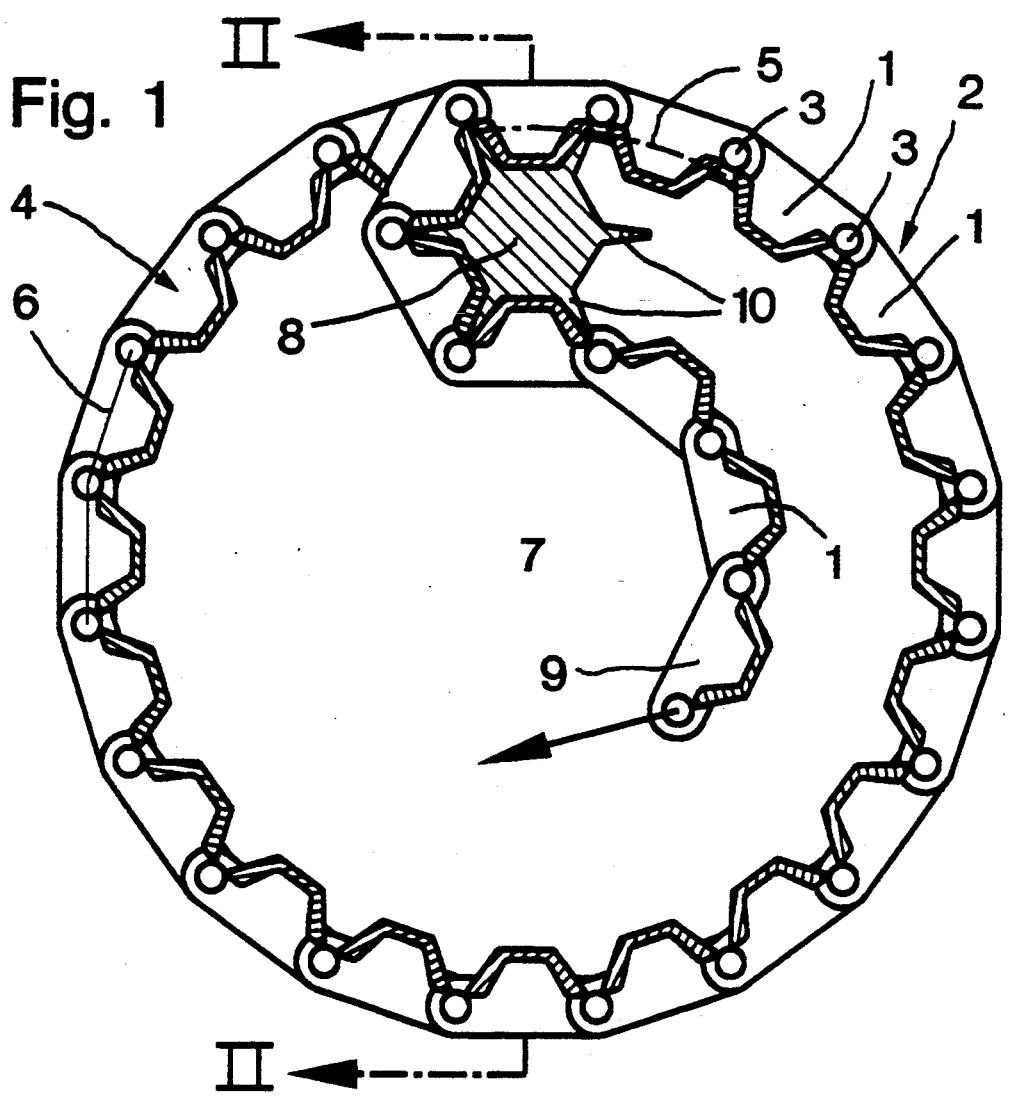
FIG. 1, which is a schematic arrangement of a drive chain in the shape of a gear ring with a magazine for the free end of the drive chain.

In connection with the toothed wheel shown partially schematically in FIG. 1, a drive chain 2, composed of a plurality of individual links 1, is illustrated, wherein the individual links 1 of the chain are movably connected with each other via hinges 3. A gear ring 4 is formed by means of the links 1 arranged in an exactly circular shape, the outer tooth structure of which is located on a reference circle 5. The hinges 3 of the links 1 forming the gear ring 4 are arranged on a circular neutral elastic line 6, wherein the individual links 1 form a regular polygon.

A magazine 7 for the free end 9 of the drive chain 2, which is guided inward via an auxiliary toothed wheel 8, is provided in the interior of the gear ring 4. As can be seen from FIG. 1, the auxiliary toothed wheel 8 has the approximate shape of a spiked roller with six pulling bars 10 distributed over its surface, which engage the spaces between the angled links 1 of the inward guided drive chain 2.

The free end 9 of the drive chain 2 is affected by a pulling force which pulls the free end 9 into the magazine 7 in a controlled manner. For cooperation with a transfer member not shown in detail, such as a toothed wheel, a toothed belt, a beaded cord, a punched belt or a chain, the drive chain 2 has an outer tooth structure sketched in FIG. 1. The inside of the drive chain 2 is for all practical purposes also embodied with a tooth structure cooperating with the auxiliary toothed wheel 8.

Figure 2:
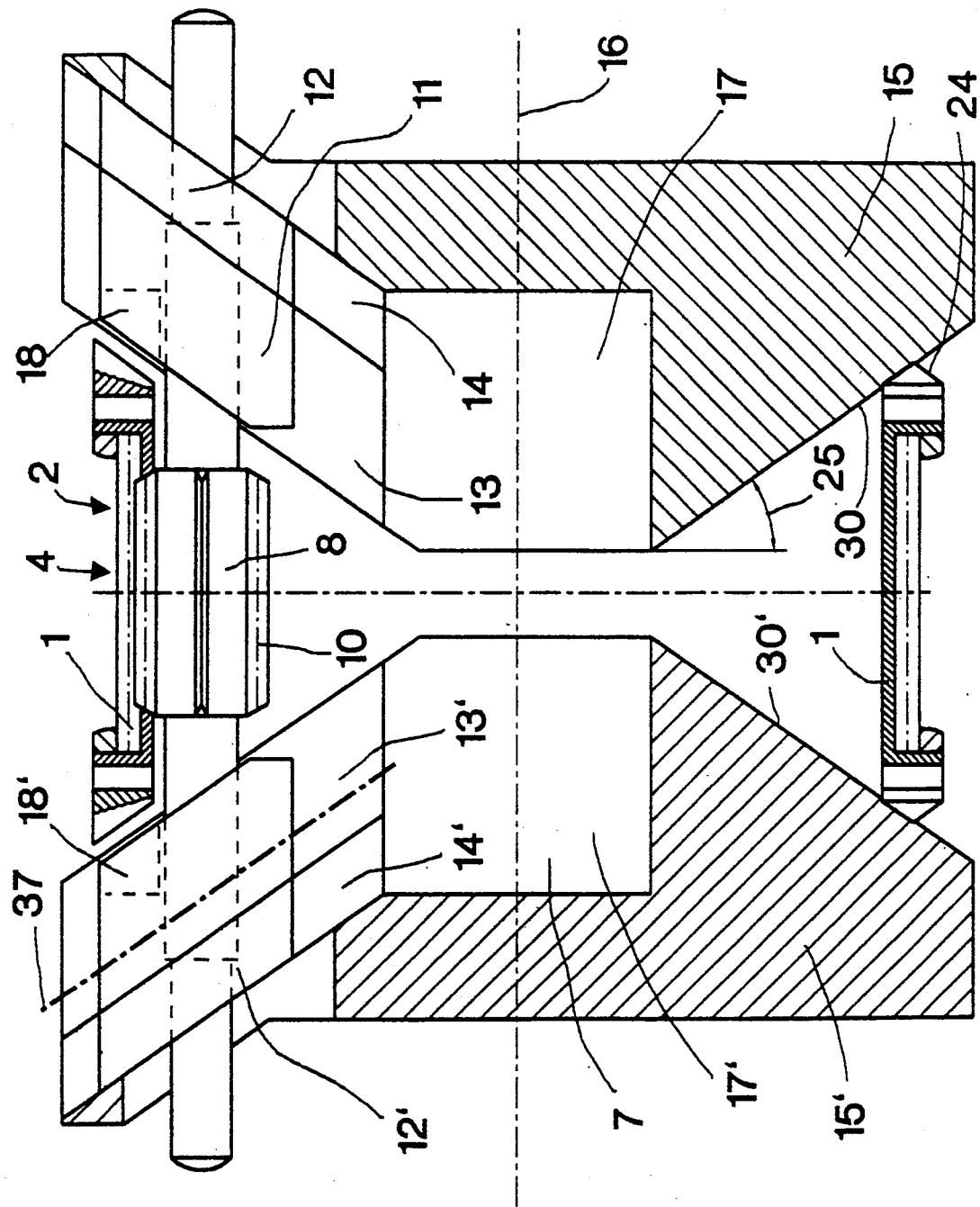
FIG. 2, which is a schematic section II—II of FIG. 1 through a gear mechanism in the area of the auxiliary toothed wheel.

A schematic section along the line II—II in FIG. 1 is shown in FIG. 2, wherein the radial displaceability of the auxiliary toothed wheel 8 is visible. It is driveably seated on each one of carriages 11 which are embodied in the form of T-grooves, the legs 12, 12' of which are guided in slantingly extending guide recesses 13, 13' in T-grooves 14, 14' of two cones 15, 15'. The guide recesses 13, 13' from transitions in the direction towards the axis of rotation 16 into concentric recesses 17, 17', which, for practical purposes, are used as magazines 7 for the free end(s) 9 of the drive chain 2.

By shortening the drive chain 2 through turning of the auxiliary toothed wheel 8 by a predetermined angle of rotation, a link 1 of the drive chain 2 is brought into the magazine 7 or, with larger angles of rotation, several links 1. Because of the shortening of the drive chain 2, the diameter of the reference circle 5 is reduced and the cones 15, 15' are pushed apart, along with the simultaneous radial displacement of the drive chain 2, together with the auxiliary toothed wheel 8.

The end of the drive chain 2, which is always inside the reference circle 5, is embodied in the shape of a fork and is suspended in recesses 18, 18' of the carriage 11 which itself supports the auxiliary toothed wheel 8. In this way this end is hingedly connected with the carriage 11. Through this it is assured even in the area of the auxiliary toothed wheel 8 that the pitch of the teeth of the entire gear ring 4 is exactly maintained.

Figure 3:
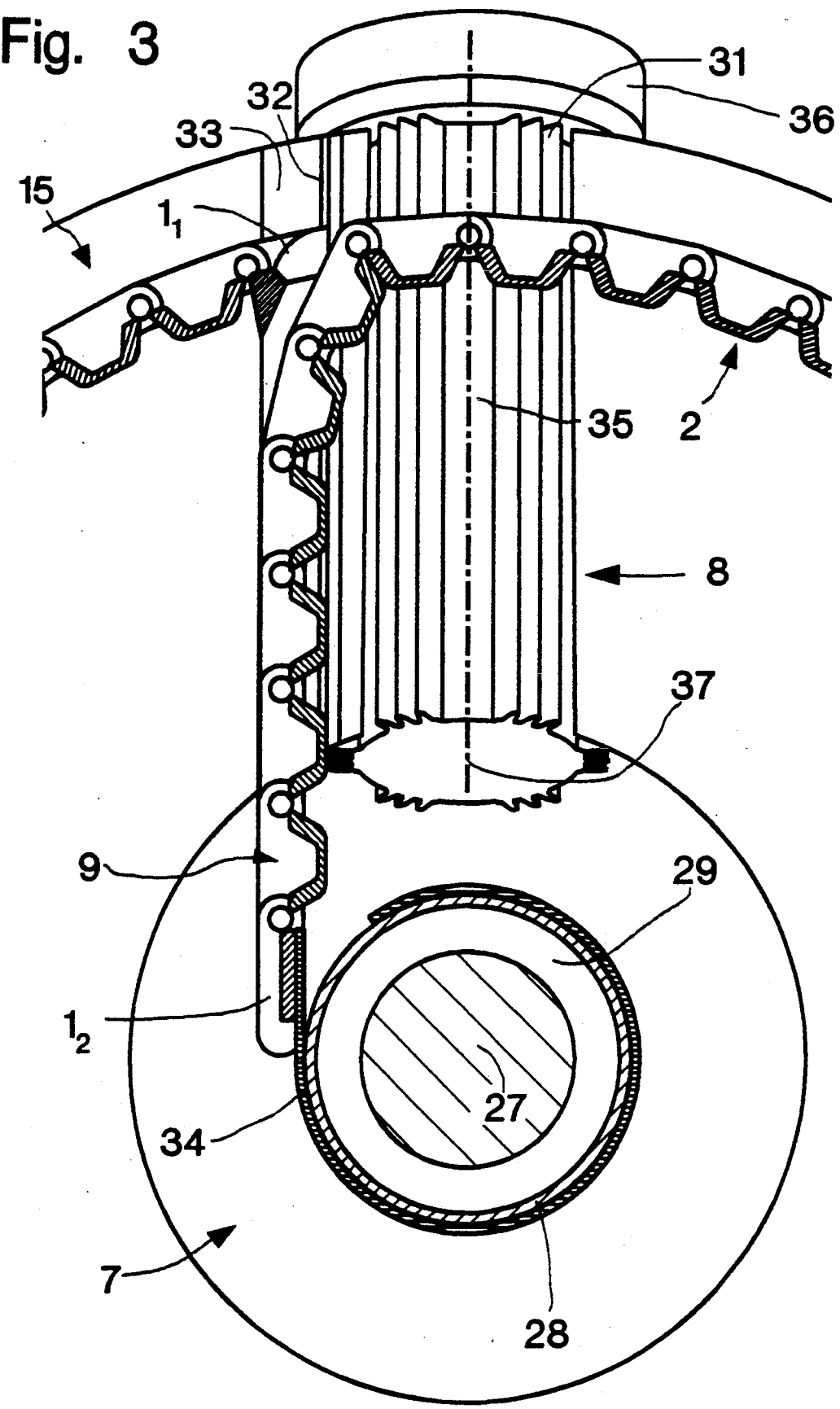
FIG. 3, which is a partial cross section through a drive chain to an enlarged scale.

A section through a lateral area of the drive chain 2 is shown on a very large scale in FIG. 3. The hinge of the chain is formed by a hollow bolt 19 having a bore 20 oriented opposite to centrifugal force, so that lubrication of the flattened part 21 is made possible. The oil is caught in an oil catch-pocket 22. In addition, lubricating oil collecting from the back of the part of the link 1 of the drive chain forming the gear ring 4 is conveyed on into the interior of the hollow bolt 19 via an oil supply groove 23. The groove 23 allows easy flow-out of the lubricant.

Furthermore, a counter cone 24 is provided aligned with the hinge axis 3', which cooperates with the cone surface 30 and has the same cone angle 25 as the cone 15 to achieve an even distribution of the load.

Figure 4:
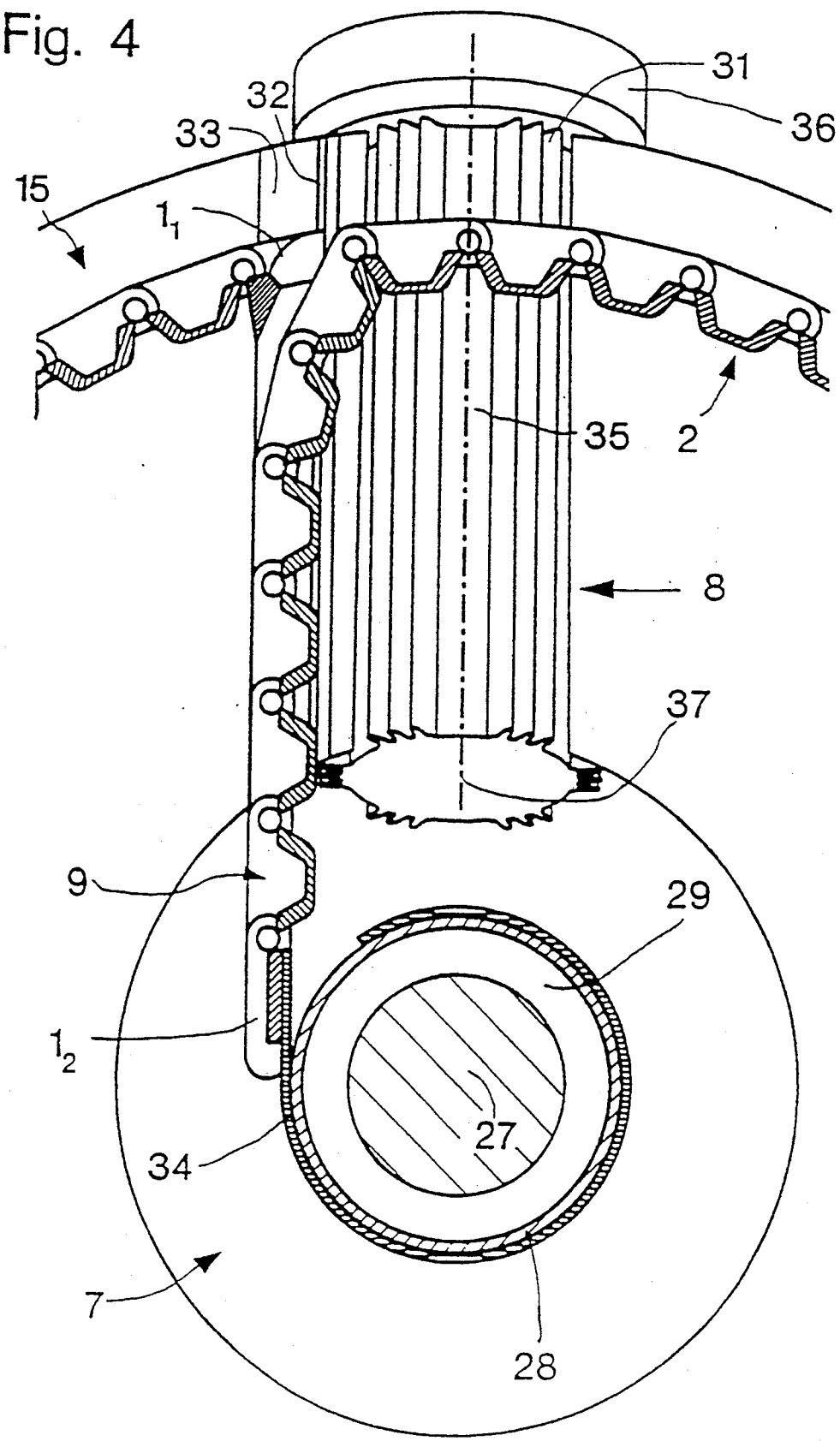
FIG. 4, which is a partial cross section of the toothed wheel of the invention in accordance with FIG. 2, having an auxiliary toothed wheel located in every inclination of the cone.

A further exemplary embodiment is shown in FIG. 4. The auxiliary toothed wheels 8 are rotatably seated opposite each other in slit-shaped windows of the cones 15, 15'. These cylindrical elongated auxiliary toothed wheels 8 are disposed in the windows, with their axes of rotation 37 parallel to the cone surfaces 30, 30', in such a way that the teeth 31 just extend above the cone surface 30'. The teeth 31 mesh with correspondingly associated teeth provided on the front of the drive chain 2, as indicated in FIG. 4. A magazine roller 28 for rolling up the end of the drive chain 2 is provided on a center shaft 27. As indicated in FIG. 4, the end of the drive chain 2 is maintained under pre-stress by a spring 29. The pre-stressing force must be comparatively large to overcome the centrifugal force acting on the piece of chain between the magazine 7 and the gear ring 4 at high rpm. In order to be able to lay out the spring 29 better, the magazine roller 28 is rotationally coupled with the shifting movement of the auxiliary toothed wheels 8 in such a way that the end 9 of the drive chain 2 is either rolled up or unrolled, depending on the shifting direction, with a further shifting movement of the auxiliary toothed wheels 8.

To guide the chain end 9 of the drive chain 2 into the magazine 7, the deflection takes place shortly after the auxiliary toothed wheels 8, as illustrated in FIG. 4. It can be seen there that the drive chain 2 is suspended by its first link 11 in a suspending groove 32 of the cone 15. It then extends in a counterclockwise direction as far as the auxiliary toothed wheel 8 and from there through the magazine guidance groove 33 into the magazine 7. A connecting link 12 connects the last link of the drive chain 2 with a belt 34 which itself is connected with the magazine roller 28.

The auxiliary toothed wheel 8 takes care of the tangential displacement of the links 1 of the drive chain 2 on the cone surfaces 30, 30' in the course of shifting. At the same time it supports the last links. The tooth-free places 35 are provided for supporting the respective counter-cone 24 on the auxiliary toothed wheel 8, as can be seen in FIG. 4. Finally, 36 identifies a step-by-step shift device, by means of which the respective auxiliary toothed wheel 8 is rotated.

I claim:

1. A gear with at least one toothed wheel having a variable number of teeth, including:
   at least one auxiliary toothed wheel;
   a magazine;

a gear ring formed by a flexible drive chain having a plurality of links, said gear ring defining an axis of rotation and a reference circle the diameter of which is changed by a change in the length of said flexible drive train, effected by means of adding or removing individual links of said flexible drive chain; and lateral guide means for laterally guiding said drive chain, wherein:

at least one free end of said drive chain is received in said magazine in a controlled manner by said auxiliary toothed wheel, said auxiliary toothed wheel and said drive chain are synchronously displaced with the radial distance change of said lateral guide means, said auxiliary toothed wheel is disposed in such a way that the last link of said plurality of links of said drive chain prior to deflection into said magazine is located in said reference circle, all links of said plurality of links of said drive chain being laterally guided at a concentric, radially changeable distance from the axis of rotation of said gear ring, and said drive chain being subjected to pre-stress.

2. The gear as defined in claim 1, wherein said at least one auxiliary toothed wheel is embodied as a rotating element.

3. The gear as defined in claim 1, wherein said at least one auxiliary toothed wheel is embodied as a circulating element.

4. The gear as defined in claim 1, wherein each link of said plurality of links have lateral support surfaces, and said lateral guide means comprise a pair of cones defining guide surfaces which are engaged by the support surfaces of said plurality of links, and wherein the axial distance between said guide surfaces change corresponding to a change of said reference circle diameter.

5. The gear as defined in claim 4, wherein said lateral support surfaces are formed by two preferably flat surfaces extending at an angle to each other, said lateral support surfaces rest against contact lines on said guide surfaces 6. The gear as defined in claim 4, further comprising:
a hinge for each link of said plurality of links, wherein:
said lateral support surfaces are formed by two counter-cones of said drive chain, the circumference of which has at least partially, the shape of a circular cone, said counter-cones being preferably disposed coaxially with said hinges for rotation.

7. The gear as defined in claim 6, wherein:
said drive chain defines a neutral elastic line, and
said neutral elastic line and said reference circle approximately coincide at least in the angular area of energy transfer.

8. The gear as defined in claim 1, wherein said drive chain conveys lubricants through the chain hinge with the aid of centrifugal force.

9. The gear as defined in claim 1, wherein said auxiliary toothed wheel is disposed such that it at least partially supports the last engaged link of said drive chain.

* * * * *